United States Patent

[11] 3,558,812

[72] Inventors Leo Heinrich Josef Franz Beckmann;
Leendert Van Den Berg, Delft, Netherlands
[21] Appl. No. 682,342
[22] Filed Nov. 13, 1967
[45] Patented Jan. 26, 1971
[73] Assignee N. V. Optische Industrie "De Oude Delft"
Delft, Netherlands
a corporation of Netherlands
[32] Priority Nov. 14, 1966
[33] Netherlands
[31] 6,615,997

[54] AERIAL RECONNAISSANCE SYSTEM
7 Claims, 4 Drawing Figs.

[52] U.S. Cl. 178/6.7
[51] Int. Cl. H04n 1/04, H04n 3/06, H04n 5/86
[50] Field of Search 179/100, 3B, 100.3GN; 178/6.7; 350/6, 7, 17, 269

[56] References Cited

UNITED STATES PATENTS

| | | | |
|---|---|---|---|
| 2,192,988 | 3/1940 | Schwarz | 179/100.3 |
| 2,235,929 | 3/1941 | Hendrich | 179/100.3 |
| 2,417,506 | 3/1947 | Lamb | 178/7.1 |
| 2,419,001 | 4/1947 | Badmaieff | 179/100.3 |
| 2,512,785 | 6/1950 | Alburger | 179/100.3 |
| 2,967,211 | 1/1961 | Blackstone | 178/6.7 |
| 3,316,348 | 4/1967 | Hufnagel et al. | 178/6.7 |

*Primary Examiner*—Bernard Konick
*Assistant Examiner*—Steven B. Pokotilow
*Attorney*—Arthur B. Colvin

ABSTRACT: Infrared aerial reconnaissance system of the line scanning type in which, for a wide range of velocity-altitude ratio ($v/h$) conditions, objectionable line patterns in the strip photograph produced by the flying spot recorder are avoided by varying the width of the spot traces on the film with the rate at which the film is moved past the exposure station.

INVENTORS
Leo Heinrich Josef Franz Brikmann
Leendert van den Berg
BY

INVENTORS
LEO HEINRICH JOSEF FRANZ BECKMANN
LEENDERT VAN DEN BERG
BY

AERIAL RECONNAISSANCE SYSTEM

This invention relates to aerial reconnaissance systems which record a picture of a terrain seen from an airplane on a strip of photographic film, and consist of a scanner and a photographic recorder. The scanner produces an electric video signal by periodically scanning at a constant rate a narrow strip of "line" of the terrain which extends crosswise to the course of flight. The recorder has a light source intensity modulated by the video signal and providing a light spot which is made to repetitively scan the film strip crosswise in synchronism with the scanner. During the scanning the film strip is fed lengthwise at a uniform rate which is controllable dependent on the ratio between the ground velocity and the altitude of the airplane.

Systems of this class utilize the airplane movement as the slower scanning motion so that solely the fast scanning motion (the line-scanning) must be produced by the system itself. A typical application is the so-called thermographic camera whose operation is based on the infrared rays of long wave length transmitted by the terrain. As is well-known photographic materials are insensitive to such radiation.

The scanners usually operate with a beam of constant angular width, as determined by the sensitive area of the infrared detector (the image "point") and the focal length of the scanning optics. Consequently, the width of the line scanned on the ground is directly proportional to the flight altitude. Since the scanning repetition frequency, i.e., the number of line scans per second, is a constant as well, it follows that for each velocity of the airplane there will exist only one altitude at which successively scanned ground strips will be contiguous exactly, i.e., touch each other without gaps or overlaps, and vice versa.

Obviously, this applies only to a relatively small portion of the terrain lying precisely under the airplane, within which the scanned line may be said to have a practically constant width. If, as is usually the case, a very wide angle is scanned, e.g., of 120°, the line width will increase considerably with the distance from the airplane. Consequently, at both ends of the scan the terrain strips successively scanned will still overlap each other when they are contiguous right under the airplane.

In some conventional systems of the type indicated the film in the recorder is scanned by a light spot of constant dimensions. In order to avoid distortions in the photographic picture in the direction of flight the rate at which the film is fed through the recorder should be varied with the ground velocity $v$ and the altitude $h$ of the airplane in such a manner that it is directly proportional to the ratio $v/h$. In practice, a stepwise control is often applied instead of the continuous adaptation required. The constant size of the light spot in the recorder will be chosen so that it corresponds to the width of the terrain strips scanned under certain given conditions. That is to say, if these terrain strips are contiguous with a given velocity and altitude of the airplane and if the film is fed at the rate corresponding with these $v$ and $h$ values, then the traces written by the spot on the film will be contiguous too. In that case, however, the spot traces will necessarily overlap each other if due to a lower ratio $v/h$ the terrain strips do so. Such overlapping, if moderate, will not seriously degrade the quality of the picture. More serious objections will result from the gaps left between successive terrain strips if the ratio $v/h$ is made to exceed the value to which the spot size is adapted. These gaps will appear as nonexposed strips on the film, resulting in a very pronounced line pattern in the photographic picture. In practice it is desired to operate systems of the type discussed in a relatively wide range of $v/h$ ratios, covering, e.g., a factor of 10. It will be evident that with a value of $v/h$ largely exceeding the optimum value photographic pictures will be obtained in which the successive lines are separated by nonexposed strips which are much wider. This renders the evaluation of such pictures very difficult if no special aids are to be used. In fact the workability of these devices is strongly limited by this effect.

It is the principal object of the present invention to avoid this limitation.

In accordance with the invention the means providing the moving light spot in the recorder are arranged so that the spot has approximately rectangular shape, the dimension of the spot lengthwise of the film strip being made to vary with the speed of the film strip in such a manner that the tracks made by the spot on the film will be substantially contiguous at various film speeds.

In some conventional systems the film is curved laterally at the exposure station so that it conforms to a portion of a cylinder. To form the moving light spot a diaphragm lighted by the intensity-modulated light source is imaged on the curved film by means of a microscope objective which has its optical axis perpendicular to the film cylinder axis and is rotated about that axis in synchronism with the scanner. The microscope objective receives its light from the diaphragm via an oblique mirror which is rotated in unison with the objective.

If in the system of the invention a similar arrangement is applied a slit diaphragm may be used which is placed on the film cylinder axis so that the slit extends perpendicular to such axis, and which is rotatable in unison with the microscope objective and the oblique mirror. In order to make the width of the traces written by the spot variable the slit diaphragm may be combined with a fixedly mounted iris diaphragm whose aperture is adjustable in response to variations of the film speed. Alternatively, the slit diaphragm may be lighted with a light beam of circular cross section derived from the intensity-modulated light source, the diameter of which beam is controllable in response to changes in film speed.

The present invention also contemplates the use of a slit diaphragm having a slit which extends parallel to the film cylinder axis and which is moved in a cylindrical surface about such axis. In this case a cylindrical sleeve coaxial with that surface and slidable axially in response to changes in film speed may be used to control the slit length. A pair of further oblique mirrors rotating in unison with the slit diaphragm must then be arranged on both sides of the slit to form the radial light path through the slit.

Some embodiments of the invention will be described in detail with reference to the drawings, in which.

Figure 1:
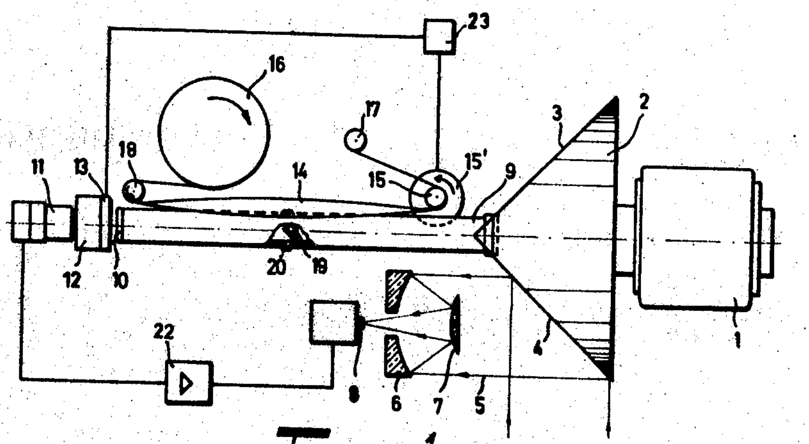
FIG. 1 shows a complete system, partly in elevation, partly in cross section wherein the scanner and the photographic recorder are mechanically coupled.

Referring to FIG. 1, an electric motor 1 drives a scanning mirror 2 at a constant high speed. Mirror 2 is a so-called roof mirror. It has a lightweight metal body of circular cross section and two mirrored end faces 3 and 4 at 45° with respect to the axis of rotation. These faces alternately scan in a well-known manner a narrow ground strip through an angle of, e.g., 120°. A beam 5 of long wavelength infrared radiation received from the ground is reflected toward a Cassegrainian mirror objective consisting of a concave primary mirror 6 and a convex secondary mirror 7 and is focused thereby on the minute radiation sensitive surface of an infrared detector 8. The size of this surface together with the focal length of the mirror objective 6, 7 determine the spread angle of the scanning beam and, hence, the width of the strip scanned on the ground (the resolving power).

Secured to the roof mirror 2 is a hollow shaft 9, in which the moving parts of the photographic recorder are accommodated. The correct mutual synchronization of the scanner and the recorder is thus always automatically obtained. However, it will be understood that such a bodily unification of the two devices is not essential. They may be separate units as well and the recorder need not be airborne if, in any well-known manner, sync pulses are added to the video signal before transmission to the recording station.

The hollow shaft 9 carries at its free end a slit diaphragm 10. This is lighted from the left by an intensity modulated light source 11, such as a glow modulator lamp, through a condenser 12 and a conventional fixedly positioned iris diaphragm 13. A film strip 14 is fed from a supply reel 16 to a takeup reel 17 by a sprocket 15 driven by an electric motor 15′ at a uniform rate. At the exposure station between the driving sprocket 15 and an idling roller 18 guiding means of any well-known kind (not shown) are provided to curve the film laterally so as to conform to a partly cylindrical surface coaxial with the shaft 9.

In the hollow shaft 9 a roof prism 19 having mirrored faces is mounted whose roof angle is slightly greater than 90°. Two microscope objectives 20 and 21 are screwed into the wall of the hollow shaft such that their optical axes coincide and are perpendicular to the axis of shaft 9. The location of the various parts mentioned is such that the objectives 20 and 21 each form a sharply focused and strongly demagnified image of the irradiated slit of diaphragm 10 on the cylindrical surface of the film strip. Alternately the slit images produced by the objectives will scan the film synchronously with the scanning of the terrain by the mirror faces 3 and 4 of the scanner. The intensity of the glow modulator lamp is continuously modulated in response to the video signal supplied by the detector 8 and amplified in an amplifier 22.

Due to the curvature of the film strip, terrain portions which lie beside the course flown by the airplane, will be reproduced as compressed in the lateral direction. This may be referred to as cylindrical distortion. It increases with the distance of the relevant terrain portions from the line of flight. As discussed hereinbefore, by suitably selecting the film speed a distortion of the picture in the direction of flight can also be obtained. More particularly, a linear compression of the picture in that direction can be produced if the film is fed at a lower rate than would follow from the *v/h* ratio of the airplane. Accordingly, by varying the film speed it is possible to select certain strips of terrain extending parallel to the flight course at different distances for distortion-free reproduction.

Due to the slit diaphragm 10 rotating in unison with the roof prism 19 the orientation of the slit image on the film is invariable. By means of the iris diaphragm 13 the length of the slit, that is its dimension perpendicular to the roof edge of the mirror 19, can be varied between certain limits. This dimension determines the width of the trace made on the film. The other dimension of the slit which is much smaller than the maximum length, is invariable. This dimension determines the size of the light spot in the direction of scanning.

Instead of the iris diaphragm 13, other means for changing the effective slit length can be used. Thus, the slit may be lighted with a circular beam of variable diameter. Such a beam could be obtained from a diaphragm with a constant circular aperture which is imaged on the slit diaphragm by means of a pair of zoom objectives in a so-called tandem arrangement. If the focal lengths of these zoom objectives are varied in opposite sense, the size of the image of the fixed diaphragm on the slit is changed while the image remains sharply focused.

As discussed hereinbefore the rate at which the film 14 is moved past the recording station, as well as the length of the slit diaphragm 10, will generally be varied proportionally to the ratio *v/h*. To that end an automatic control device 23 of any conventional construction may be used. It will be understood, however, that in many cases a simple stepwise control will be sufficient for the purpose envisaged, in which the speed of the film driving motor and the effective slit length are adjusted by hand to the value of *v/h* at which it is intended to fly. These adjustments can also be made from a remote control station so as to permit changes during the flight.

Figure 2:
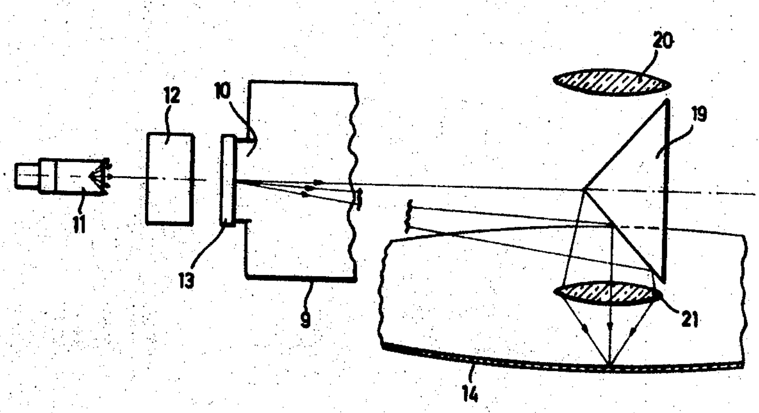
FIG. 2 illustrates at a larger scale some parts of the recorder seen in FIG. 1.
Figure 3:
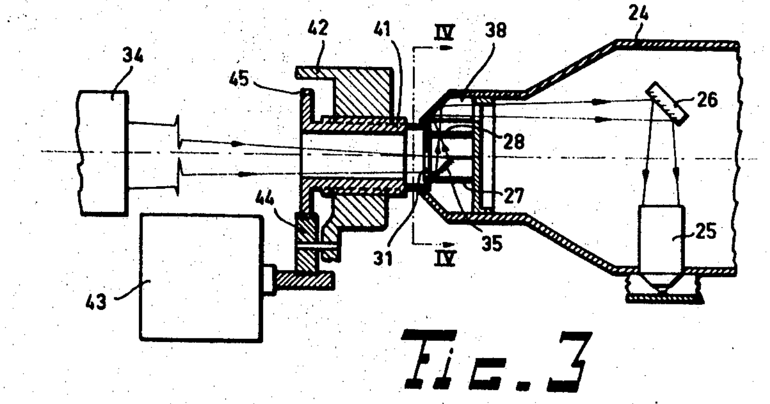
FIG. 3 shows a different form of recorder.

The recorder of which FIG. 3 shows the essential parts, differs from that of FIG. 2 in that it is arranged for cooperation with a scanner (not shown) having three scanning faces instead of the two mirror faces 3 and 4 in FIG. 1. Accordingly, the recorder has three microscope objectives spaced 120° apart, instead of the two objectives 20 and 21 shown in FIG. 2. A further difference is that the recorder of FIG. 3 has three slits, i.e., one for each microscope objective, and that these slits extend parallel to the axis of rotation of the recorder and are moved in a cylindrical surface about that axis.

The recorder has a rotatable tubular part 24 which, like the shaft 9 in FIG. 1, may be secured to the scanner to obtain synchronism between the two. The three microscope objectives of which only one, 25, has been shown are screwed into the wall of part 24. Each of them receives a beam of light from one of three mirrors like 26 mounted in the tube 24. These beams come from three slits provided in the cylindrical wall of a cup-shaped diaphragm 27 which is mounted in the tubular part 24.

Figure 4:
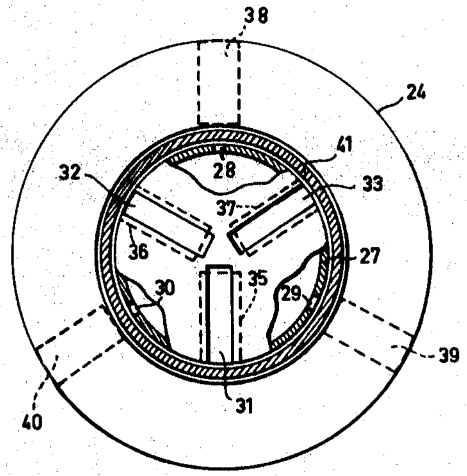
FIG. 4 is a cross-sectional view of the recorder of FIG. 3.

As seen in FIG. 4 these slits 28, 29 and 30 are 120° spaced apart. The bottom of cup 27 has three elongated apertures 31, 32 and 33, through which light from the modulated light source 34 falls on three mirrors 35, 36 and 37 mounted inside the cup 27 which reflect such light to the slits 28, 29, 30, respectively. Three prisms 38, 39 and 40 mounted outside the diaphragm cup 27 then reflect the light transmitted by the slits toward the respective mirrors 26.

The slit length is now conveniently controlled by means of a cylindrical sleeve 41 whose thin-walled end extends into the air gap surrounding the diaphragm 27. The sleeve 41 is screw-threaded into a wall portion 42 of the instrument housing so as to be axially movable under the control of a reversible motor 43 which imparts rotation to the sleeve through a gear wheel 44 and a toothed rim 45 on sleeve 41.

The invention, accordingly, provides simple and reliable means to secure photographic records having contiguous image lines for a great variety of *v/h* ratios, thus rendering the photographs easily evaluable. Thus, the system according to the invention lends itself readily to reconnaissance work at very different altitudes.

We claim:

1. A system for recording a picture of a terrain from an airplane on a photographic film strip, comprising a scanner producing an electric video signal by periodically scanning at a constant rate a narrow strip of the terrain extending crosswise to the course of flight, and a photographic recorder having a light source, means to modulate the intensity of the light source in response to the video signal, means to derive a moving light spot from said light source which spot periodically scans the film strip crosswise in synchronism with the scanner, and means to feed the film strip lengthwise at a uniform rate controllable in response to variations of the ratio between the ground velocity and the altitude of the airplane, said system being characterized in that said means to derive the scanning light spot are arranged so that the spot has approximately rectangular shape, and in that means are provided to vary the dimension of the spot lengthwise of the film strip with the speed of the film strip in such a manner that the tracks made by the spot on the film will be substantially contiguous at various film speeds corresponding to various conditions of flight.

2. A system for recording a picture of a terrain from an airplane on a photographic film strip, comprising a scanner producing an electric video signal by periodically scanning at a constant rate a narrow strip of the terrain extending crosswise to the course of flight, and a photographic recorder having a light source, means to modulate the intensity of the light source in response to the video signal, means to derive a moving light spot from said light source which spot periodically scans the film strip crosswise in synchronism with the scanner, and means to feed the film strip lengthwise at a uniform rate controllable in response to variations of the ratio between the ground velocity and the altitude of the airplane, said system being characterized in that said means to derive the scanning light spot are arranged so that the spot has approximately rectangular shape, means are provided to vary the dimension of the spot lengthwise of the film strip with the speed of the film strip in such a manner that the tracks made by the spot on the film will be substantially contiguous at various film speeds corresponding to various conditions of flight, means are provided to curve the film strip laterally at the place where it is scanned by said spot so that it conforms to a portion of a cylinder, and in which said scanning spot deriving means comprises a diaphragm lighted by said light source, a microscope objective for imaging the diaphragm on the curved film which has its optical axis perpendicular to the axis of said cylinder and is arranged for rotation about such cylinder axis in synchronism with the scanner, and an oblique mirror rotatable in unison with the microscope objective and reflecting light from the diaphragm toward the microscope objective, said diaphragm being a slit diaphragm arranged for rotation in unison with said microscope objective and having a variable effective slit length.

3. A system as claimed in claim 2, in which the slit of the diaphragm extends parallel to said cylinder axis so as to be moved in a cylindrical surface when the diaphragm is rotated, further reflecting means rotatable in unison with the diaphragm being provided on both sides of the slit to form a radial light path through the slit.

4. A system as claimed in claim 3, in which a cylindrical sleeve is provided which is coaxial with the cylindrical surface in which the diaphragm is moved, said sleeve being axially slidable so as to vary the effective length of the slit.

5. A system as claimed in claim 2, in which the slit of the diaphragm extends perpendicularly to said cylinder axis.

6. A system as claimed in claim 5 in which the effective slit length is varied by an iris diaphragm fixedly mounted in alignment with said cylinder axis.

7. A system as claimed in claim 5, in which means are provided to light the slit diaphragm with a light beam derived from the light source and having a circular cross section of variable diameter at the place of the slit diaphragm.